(12) United States Patent
Yu et al.

(10) Patent No.: US 10,572,777 B2
(45) Date of Patent: Feb. 25, 2020

(54) DEEP DEFORMATION NETWORK FOR OBJECT LANDMARK LOCALIZATION

(71) Applicant: NEC Laboratories America, Inc., Princeton, NJ (US)

(72) Inventors: Xiang Yu, Mountain View, CA (US); Feng Zhou, Sunnyvale, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 313 days.

(21) Appl. No.: 15/436,199

(22) Filed: Feb. 17, 2017

(65) Prior Publication Data

US 2017/0262736 A1  Sep. 14, 2017

Related U.S. Application Data

(60) Provisional application No. 62/306,894, filed on Mar. 11, 2016.

(51) Int. Cl.
*G06K 9/62* (2006.01)
*G06K 9/00* (2006.01)
(Continued)

(52) U.S. Cl.
CPC ....... *G06K 9/6269* (2013.01); *G06K 9/00369* (2013.01); *G06K 9/00718* (2013.01);
(Continued)

(58) Field of Classification Search
CPC ............. G06K 9/6269; G06K 9/00718; G06K 9/6206; G06K 9/4671; G06K 9/00369;
(Continued)

(56) References Cited

U.S. PATENT DOCUMENTS

2008/0317294 A1* 12/2008 Hashimoto ........ G07C 9/00158
382/115
2012/0206596 A1* 8/2012 Samarasekera ...... G01C 21/005
348/135

(Continued)

OTHER PUBLICATIONS

Sun et al., "Deep Convolutional Network Cascade for Facial Point Detection", 2013 IEEE Conference on Computer Vision and Pattern Recognition, Jun. 2013, pp. 3476-3483.

Zhang, et al., "Improving Multiview Face Detection with Multi-Task Deep Convolutional Neural Networks", IEEE Winter Conference on Applications of Computer Vision, Mar. 2014, pp. 1036-1041.

(Continued)

*Primary Examiner* — John W Lee
(74) *Attorney, Agent, or Firm* — Joseph Kolodka

(57) ABSTRACT

A system and method are provided. The system includes a processor. The processor is configured to generate a response map for an image, using a four stage convolutional structure. The processor is further configured to generate a plurality of landmark points for the image based on the response map, using a shape basis neural network. The processor is additionally configured to generate an optimal shape for the image based on the plurality of landmark points for the image and the response map, using a point deformation neural network. A recognition system configured to identify the image based on the generated optimal shape to generate a recognition result of the image. The processor is also configured to operate a hardware-based machine based on the recognition result.

21 Claims, 5 Drawing Sheets

(51) Int. Cl.
*G06K 9/46* (2006.01)
*G06T 7/73* (2017.01)
*G06N 3/04* (2006.01)
*G06T 7/60* (2017.01)
*G06N 3/08* (2006.01)

(52) U.S. Cl.
CPC ......... *G06K 9/4671* (2013.01); *G06K 9/6206* (2013.01); *G06K 9/627* (2013.01); *G06N 3/04* (2013.01); *G06N 3/0445* (2013.01); *G06N 3/0454* (2013.01); *G06T 7/60* (2013.01); *G06T 7/73* (2017.01); *G06N 3/08* (2013.01); *G06T 2207/20101* (2013.01)

(58) Field of Classification Search
CPC . G06K 9/627; G06N 3/04; G06N 3/08; G06T 7/73; G06T 7/60; G06T 2207/20101
See application file for complete search history.

(56) References Cited

U.S. PATENT DOCUMENTS

| | | | | |
|---|---|---|---|---|
| 2014/0132604 | A1* | 5/2014 | Bao | G06T 17/00 345/420 |
| 2015/0347820 | A1* | 12/2015 | Yin | G06K 9/00221 382/118 |
| 2015/0347822 | A1* | 12/2015 | Zhou | G06K 9/4628 382/118 |

OTHER PUBLICATIONS

Shaoxin Li et al. "Shape Driven Kernel Adaptation in Convolutional Neural Network for Robust Facial Trait Recognition" in IEEE Conference on Computer Vision and Pattern Recognition (CVPR), 2015, pp. 222-230 (see pp. 224, 226 through 229).

Leon Gu et al., "A Generative Shape Regularization Model for Robust Face Alignment", In ECCV '08, 2008, pp. 1-4 (see p. 9).

\* cited by examiner

500

Generate, by a processor using a four stage convolutional structure, a response map for an image.
510

Generate, by the processor using a shape basis neural network, a plurality of landmark points for the image based on the response map.
520

Generate, by the processor using a point deformation neural network, an optimal shape for the image based on the plurality of landmarks for the image and the response map.
530

Identify, by a recognition system, the image based on the generated optimal shape to generate a recognition result of the image.
540

Operate a hardware-based machine based on the recognition result.
550

FIG. 5

DEEP DEFORMATION NETWORK FOR OBJECT LANDMARK LOCALIZATION

RELATED APPLICATION INFORMATION

This application claims priority to U.S. Provisional Patent Application Ser. No. 62/306,894 filed on Mar. 11, 2016, incorporated herein by reference in its entirety.

BACKGROUND

Technical Field

The present invention generally relates to computer vision and more particularly to object pose estimation.

Description of the Related Art

Object pose estimation is the key to solve many fundamental problems in computer vision, such as object recognition, human tracking, facial image analysis, etc. The pose estimation problem covers a wide range of types, i.e., human body pose estimation, head pose estimation, etc. It has drawn the attention of researchers, which have developed numerous methods. Due to the non-linearity of the pose variation and the specificity of each pose type, the problem is still extensively under investigation. Yet there are seldom methods that can handle more than one type of pose estimation problem.

Two of the mostly developed pose estimation problems are facial landmark localization and human body pose estimation. Head pose estimation is considered near-rigid because it is determined by the holistic movement of the head. However, when required to localize more finely defined key features, e.g., key positions of eye corners and mouth, the problem becomes non-linear because the key positions' movement relies on not only the head movement but also the local deformation caused by the non-linear facial skin and expressions. Human body pose estimation is a typical non-linear deformation problem because the body parts are articulated from each other. The movement of a part is rigid. But, when parts are connected as a holistic shape, the body movement is highly nonlinear because each part's movement is not consistent with others and the articulation causes folding of the parts.

SUMMARY

According to an aspect of the present principles, a method for using a convolutional neural network is provided that is performed on a processor. The method includes the processor generating a response map for an image, using a four stage convolutional structure. The method further includes the processor generating a plurality of landmark points for the image based on the response map, using a shape basis neural network. The method also includes the processor generating an optimal shape for the image based on the plurality of landmark points for the image and the response map, using a point deformation neural network. The method additionally includes a recognition system identifying the image based on the generated optimal shape to generate a recognition result of the image. The method also includes operating a hardware-based machine based on the recognition result.

According to another aspect of the present principles, a system is provided. The system includes a processor. The processor is configured to generate a response map for an image, using a four stage convolutional structure. The processor is further configured to generate a plurality of landmark points for the image based on the response map, using a shape basis neural network. The processor is additionally configured to generate an optimal shape for the image based on the plurality of landmark points for the image and the response map, using a point deformation neural network. A recognition system configured to identify the image based on the generated optimal shape to generate a recognition result of the image. The processor is also configured to operate a hardware-based machine based on the recognition result.

According to yet another aspect of the present principles, a processor configuration is provided. The system includes a processor. The processor is configured to generate a response map for an image, using a four stage convolutional structure. The processor is further configured to generate a plurality of landmark points for the image based on the response map, using a shape basis neural network. The processor is additionally configured to generate an optimal shape for the image based on the plurality of landmark points for the image and the response map, using a point deformation neural network. The processor is also configured to operate a hardware-based machine based on a recognition result obtained from a recognition system configured to identify the image based on the generated optimal shape to generate the recognition result of the image.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a flow diagram illustrating a method for estimating object poses, in accordance with an embodiment of the present invention.

DETAILED DESCRIPTION OF PREFERRED EMBODIMENTS

Figure 1:
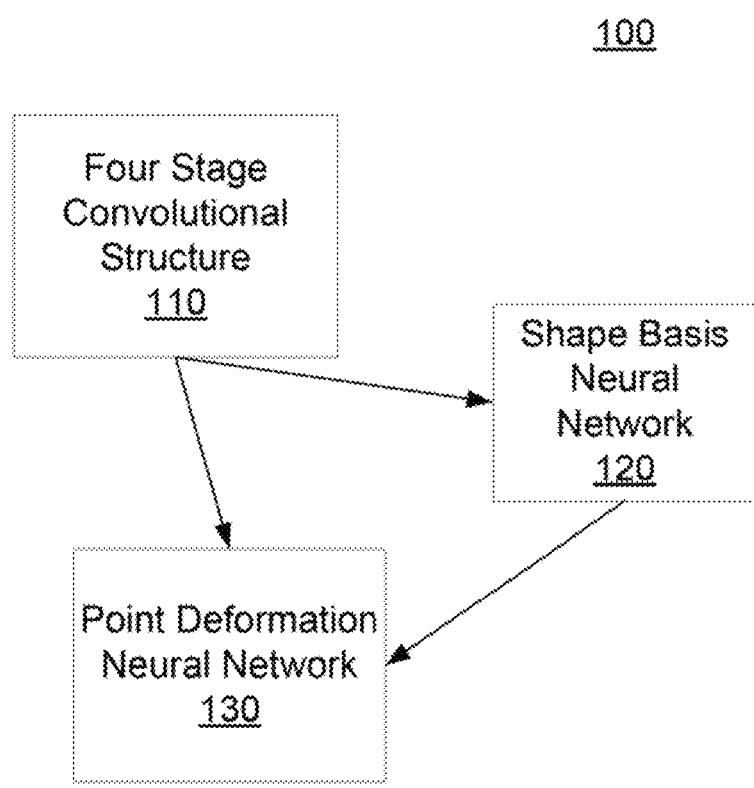
FIG. 1 is a block diagram illustrating a high-level convolutional neural network system, in accordance with an embodiment of the present invention.

Though facial landmark localization and human body pose estimation are very challenging because of the high non-linearity, there are many successful methods to effectively deal with the specificity of the problems. In face landmark localization, Active Shape Models (ASM) decompose the shape space into a linear combination of the shape basis, which largely reduce the dimension of the non-linear deformation. However, the linear combination is a low-rank approximation, which loses large local non-linear information. The accuracy of the ASM is further improved by Active Appearance Models (AAM) and Constrained Local Models (CLM), which consider not only the holistic shape constraint but also the appearance constraint. The appearance feature is object-dependent. In other words, the appearance feature designed for one pose estimation task cannot be utilized in other pose estimation tasks. For example, the shape-indexed feature and local binary feature are designed based on the specificity of the facial appearance. The body articulation points do not show the feature pattern which appears in the facial appearance, i.e., eye corners (corner pattern), face profile (line pattern), etc.

On the other hand, in body pose estimation, articulation shows the specificity which do not appear in other pose problems. For instance, eyes are always below the eyebrows. But the ankle is allowed to be higher than the leg. The early work is based on the pictorial structure, which is further developed as the deformable part model (DPM). The DPM defines the geometric connection among the body parts and applies the graphical model to jointly localize all the parts. Not until the DPM was successfully applied to face landmark localization did the researchers find the DPM was a general hand-crafted model for pose problems. The performance of the DPM is highly correlated with the appearance features while the efficiency of graphical model inference depends on the specific geometric connection.

Recently, the Convolutional Neural Network (CNN) has shown strong power in feature representation. There are many CNN based works in both face landmark localization and human body pose estimation. Most of these methods focus on dealing with the feature map, which is generated from the CNN structure. By carefully designing the CNN structure and combining part-based models or graphical models, the performance has shown significant advantages over the previous methods. However, the manipulation of the feature maps not only increases the training and testing complexity but also hard-codes the geometric connectivity. A CNN based spatial transformer network shows that the geometric transformation can be incorporated with the CNN structure. To save the training and testing of the additional part-based models or graphical models, we intend to use an end-to-end CNN framework which does not bother the feature map and incorporates the geometric transformation into the network.

A Deep Deformation Network (DDN) can be used to investigate the general pose estimation problem. Our assumption is the shapes or landmarks for each pose type share one shape space. Decomposing the shape space with a low-rank constraint largely reduce the representation complexity, in which we finely designed a Shape Basis Network (SBN) to provide a good initialization. Another assumption is that an arbitrary shape could be mapped with a uniformly initialized shape under specific constraints, i.e., rigid constraint, affine constraint, etc. We use a Point Deformation Network (PDN) to achieve the geometric transformation. For the specificity of each pose estimation task, e.g., the specific landmark annotation, the network implicitly learns the information from both the convolutional layers and the loss function layers. We evaluate our general framework on three pose estimation tasks: the facial landmark localization; human body pose estimation; and bird pose estimation.

The facial landmark localization, human body pose estimation, and bird pose estimation each have their own use today. The facial landmark localization can be used in facial recognition and emotion recognition applications. This could allow law enforcement to find a person of interest from a security camera image taken during a crime, it could assist a social media application to select ads to display to a user based on the emotions expressed in a picture uploaded to the social media site, or it could be used to unlock a locked door based on the identity of a person trying to access the door. The bird pose estimation can be used in bird species recognition.

The human body pose estimation has a multitude of applications. It can be used by personal care robots that can be deployed in assisted living homes. Human detection and pose estimation with high accuracy can be used to safeguard the residents of the assisted living home. For example, poses indicative of a health crises such as being unconscious can be detected and a notification of the same provided in order to get timely assistance to persons in need. Avatar animation is one such example where human pose helps in developing animation. Intelligent driver assisting system can use the human body pose estimation to both detect the position of the driver, for drowsy driver detection, and detect pedestrians near the road ahead of the vehicle to offer avoidance alerts to the driver when a pedestrian is entering the roadway. Other applications include Physical therapy, study of cognitive brain development of young children, video surveillance, animal tracking and behavior understanding to preserve endangered species, sign language detection, advanced human computer interaction, and markerless motion capturing.

A DDN can efficiently and accurately localize object key points. The overall network structure is mainly composed by three components: (1) to extract discriminative visual features, the VGGNet is modified to contain fewer convolutional stages for generating a higher-resolution response map; (2) to approximately localize the landmark, a novel Shape Basis Network (SBN) combines a set of shape bases using the weights generated from the convolutional features; (3) these coarse landmarks are refined in a Point Deformation Network (PDN) using a TPS transformation. The whole network is trained end-to-end.

We adopt the well-known VGG-16 for feature extraction because of its state-of-the-arts performance in various tasks. Similar to most of the localization algorithms, our network takes a region of interest cropped by an object detector as the input. Following a common setup, we use 100-by-100 resolution for facial landmark localization and 200-by-200 for body and bird pose estimation. Compared to classification and detection task, localizing landmarks accurately requires the extraction of much finer information about image details. Therefore, we chopped off the last stage in the original 5-stage VGG-16 network and use the first four convolutional stages. In addition, we found from the experiments that the pooling layer actually introduces noise since the task is to accurately localize the key positions. Although the pooling layers generate shifting-invariant features, the features for the localization task should be shift-sensitive. Based on this observation, we remove all pooling layers in the network. As a result, given any image of 100-by-100 resolution, the four-stage convolutional layers can generate a 7-by-7 response map of 512 channels denoted as x.

The size of the response map is determined by the input image size and the defined network structure. The 512 channels is from the VGGNet, from which the number of channels show the optimal performance by setting it to 512.

A 7-by-7 response map is generated by sending the input image of 100-by-100 into our defined deep deformation network (DDN). There are 16 layers defined for the DDN. After each layer, there is an output. The 512×7×7 blob is the output of the 10th layer. Essentially, the output of each layer is a tensor. 512 is the number of channels. Inside each channel, the filtered image size is 7-by-7.

Suppose that we are given a set of training images $X=\{(x, y), \ldots\}$, where $x \in \mathbb{R}^d$ denotes the low-level feature extracted by the convolutional layers. Each image is annotated with n 2-D landmarks, i.e., $y=[y^{1^T}, \ldots, y^{n^T}]^T \in \mathbb{R}^{2n}$. To predict the landmark positions, most of the previous works have a direct mapping between the CNN features x and the ground-truth landmarks y. Despite its success on various tasks, learning a vanilla regressor has two limitations: (1) a single linear model is not powerful enough to model the large shape variation such as human body, although cascade regression can largely improve the performance, a proper initialization is still crucial to get a good solution; (2) given limited data, the learning of a large-capacity model has a higher risk of being over-fitting because of the lack of certain geometrical constraint.

To address the limitation of traditional regression-based methods, we use a Shape Basis Network (SBN) to predict the best possible object shape that lie in a low-rank manifold defined by the training samples. This step plays two important roles in the whole framework: (1) it provides a good initialization that is close to the ground-truth landmark for the PDN in the next step; (2) it regularizes the learning by introducing a constraint on the global geometry of the predicted landmarks.

Inspired by previous work on the ASM for face alignment, we took a simple robust, parametric model based on the Principal Component Analysis (PCA). More specifically, the SBN predicts the shape $y_s = [y_s^{1'}, \ldots, y_s^{n'}]^T \in \mathbb{R}^{2n}$ as, $$y_s = \bar{y} + Q\underbrace{f(w_s, x)}_{x_s}, \qquad (1)$$

where $\bar{y} \in \mathbb{R}^{2n}$ is the mean shape of all the training images. The columns of $Q \in \mathbb{R}^{2n \times k}$ store the top-k orthogonal basis computed by PCA. We choose k to preserve 99% energy of the covariance matrix, $\Sigma_y(y-\bar{y})(y-\bar{y})^T$. $f(w_s, x) = x_s$ is a non-linear mapping that takes the CNN feature x as input and generates the basis weight $x_s \in \mathbb{R}^k$ as output. The mapping $f(w_s, x)$ is represented by concatenating two fully connected layers, where the first layer encodes each input as a 1024-D vector, which is further reduced to the dimension of k by the second fully connected layer. The parameter of this mapping is denoted as $w_s$.

We jointly train the SBN with other network components in an end-to-end manner. During the backward propagation, given the partial gradient over $y_s$ as $\nabla y_s \in \mathbb{R}^{2n}$, we can compute the partial gradient over $x_s$ as $Q^T \nabla y_s \in \mathbb{R}^k$. We then propagate this gradient back to update the parameters of the fully connected layers ($w_s$) as well as the lower convolutional layers.

It is difficult to train the whole network from scratch. Therefore, we take the idea of Curriculum Learning by firstly pre-training the SBN in a simpler task without the consideration of the PDN. Given the PCA shape model ($\bar{y}$ and Q) and a set of training images (x), we pre-train the SBN for the optimal embedding of $x_s = f(w_s, x)$, such that the Euclidean distance between the prediction and the ground-truth (y) can be minimized, i.e., $$\min_{w_s} F = \| y - (\bar{y} + Qx_s) \|_2^2 + \lambda \| x_s \|_2^2, \qquad (2)$$

where $\lambda$ is the regularization factor which penalizes the coefficients with large $l_2$ norm. To approach Equation 2, we calculate the gradient of the loss F over $x_s$ as, $$\frac{\partial F}{\partial x_s} = 2\lambda x_s - 2Q^T(y - (\bar{y} + Qx_s)), \qquad (3)$$

which is then back-propagated to update the parameters of the fully connected layers ($w_s$) and the lower convolutional layers.

The Shape Basis Network applies the powerful CNN to generate the embedding coefficient $x_s$. With certain loss of accuracy in prediction because of low rank truncation, the SBN is designed to provide a good initialization for the refinement procedure, which is the Point Deformation Network in the following section. Moreover, since the articulation in pose estimation problems bring in large non-linear distortion, introducing the SBN largely reduces the complexity of shape transformation for the Point Transform Network as long as the SBN covers all types of shape variations.

Given the input feature x, the SBN generates the object landmark $y_s$ as a linear combination of pre-defined shape bases. As discussed before, this prediction may be inaccurate because it is limited by the linear regression model. To handle more challenging pose variation, the Point Deformation Network (PDN) is used to deform the initial shape ($y_s$) using Thin-Plate-Spline (TPS) transformation to best match with ground-truth (y).

In computer graphics and computer vision, the TPS transformation has been widely used for modeling non-linear transformation between two sets of points. The Spatial Transformer Network (STN) can learn various geometrical transformations (including TPS) for image classification in a weakly supervised manner. Though applying a similar deformation principal, our PDN is significantly different from the STN in three aspects: First, the STN aims at warping the entire input image or feature map for its following tasks; Second, our PDN is a more general framework, which accepts not only input images but also landmarks or control points; Third, warping the dense 2D images or feature maps is more spatially constrained, while warping on sparse landmarks is largely more flexible and thus could achieve better performance.

A TPS transformation consists of two parts, an affine transformation and a nonlinear one. The affine transformation is defined by a matrix $D \in \mathbb{R}^{2 \times 3}$, while the nonlinear transformation is parameterized by m control points $C = [c_1, \ldots, c_m] \in \mathbb{R}^{2 \times m}$ with the corresponding coefficients $U = [u_1, \ldots, u_m] \in \mathbb{R}^{2 \times m}$. Fixing the control points to form 10-by-10 grids (i.e., m=100). The TPS transformation for any 2-D point $z \in \mathbb{R}^2$ can be defined as:

$$g(\{D, U\}, z) = D\tilde{z} + \sum_i u_i \varphi(\| z - c_i \|_2), \qquad (4)$$

where $\tilde{z} = [z^T, 1]^T \in \mathbb{R}^3$ denotes the coordinate z in the homogeneous form. One benefit of using the TPS is that the Radial Basis Function (RBF), $\varphi(d) = d^2 \log d$, is parameter-free.

Unlike most of the previous works where the TPS transformation was used in an unsupervised manner, we learn a mapping to drive the TPS in a data-driven way. Given the convolutional feature x and the initial landmarks $Y_s = [y_s^1, \ldots, y_s^n] \in \mathbb{R}^{2 \times n}$ provided by the SBN, the PDN seeks a non-linear mapping $f_p(w_p, x) = \{D, U\}$ that generates the optimal TPS transformation $\{D, U\}$ in order to match the ground-truth $Y = [y^1, \ldots, y^n] \in \mathbb{R}^{2 \times n}$. Similar to the SBN, this mapping $f_p(w_p, x)$ is achieved by concatenating two fully connected layers, which generate a 1024-D intermediate representation. The PDN optimizes:

$$\min_{w_p} \sum_{i=1}^{n} \| y^i - g(f_p(w_p, x), y_s^i) \|_2^2 + \gamma \int \| \nabla^2 g \|_2^2 \, dy_s^i, \quad (5)$$

where $\nabla^2 g$ is the second order derivative of transformation g with respect to $y_s^i$. The weight $\gamma$ is a trade-off between the transformation error and the bending energy. Substituting Equation 4 into the Equation 5 yields an equivalent but more concise objective, $$\min_{w_p} \varepsilon = \| Y - D\tilde{Y}_s - U\Phi \|_F^2 + \gamma tr(U\Phi\Phi^T U^T), \quad (6)$$

where each element of the RBF kernel $\Phi \in \mathbb{R}^{m \times n}$ computes $\varphi_{i,j} = \varphi(\| y_s^i - c_i \|)$.

Optimizing Equation 6 over the TPS parameters D and U can be solved in a closed form. In our case, however, these two parameters are generated by the non-linear mapping $f_p(w_p, x)$ given the image feature x on-the-fly. Therefore, instead of computing its optimal solution, we optimize Equation 5 over $w_p$ using stochastic gradient descent, where we first compute the gradients over the TPS parameters as, $$\frac{\partial \varepsilon}{\partial D} = 2\Delta \tilde{Y}_S^T, \frac{\partial \varepsilon}{\partial U} = 2\Phi^T \Delta + 2\gamma U\Phi\Phi^T, \text{ where } \Delta = Y - D\tilde{Y}_S - U\Phi, \quad (7)$$

and then back-propagate them to update the mapping parameter $w_p$. Because the whole network is trained jointly, we need to calculate the gradient with respect to the input shape $y_s$ (i.e., output of STN) as, $$\frac{\partial \varepsilon}{\partial y_s} = -2(D_S^T - \Phi' u \cdot 1^T)\Delta s + \gamma u^T(\Phi'^T \Phi + \Phi^T \Phi') u \cdot 1, \quad (8)$$

where $D_s$ is the first two columns of affine matrix D, in which D is decomposed as $D=[D_s, D_t]$ according to the structure $[s^T, 1^T]^T \cdot \Phi' = [\varphi'(s, c_1), \ldots, \varphi'(s, c_m)]$ is the element-wise derivative with respect to shape $s \cdot \Delta s = y - D [s^T, 1^T]^T - \phi u$.

One of the main difficulties in training the PDN comes from the over-fitting of the non-linear mapping $f_p(w_p, x)$. This is because the number of parameters in $w_p$ is much larger than the amount of information we can get from each mini-batch. For instance, in the face alignment problem on Labeled Faces in the Wild (LFW), we have few labeled landmarks (7) for each image but a large number (100) of control points to manipulate. One common solution is to increase the regularization weight $\gamma$. However, a large $\gamma$ could reduce the flexibility of the TPS transformation for handling highly non-rigid pose variations such as human body. We therefore control the point grid regularization method to further constrain the deformation.

For each training image, we estimate the optimal TPS transformation ($\overline{D}$ and $\overline{U}$) from the mean shape $\overline{y}$ to the ground truth y offline. Then this TPS transformation is applied on the m control points $c_i \in \mathbb{R}^2$ to obtain their transformed location $y_c^i = g(\{\overline{D}, \overline{U}\}, c_i) \in \mathbb{R}^2$. By doing this, we synthesized m additional landmarks $Y_c = [y_c^1, \ldots, y_c^m] \in \mathbb{R}^{2 \times m}$ with their original positions $C = [c_1, \ldots, c_m] \in \mathbb{R}^{2 \times m}$. We therefore defined an additional loss over $Y_c$, $$\varepsilon_c = \rho \| Y_c - D_c \tilde{C} - U_c \Phi_c \|_F^2 + \sigma tr(U_c \Phi_c \Phi_c^T U_c^T), \quad (9)$$

where the terms $\tilde{C}$, $D_c$, $U_c$ and $\Phi_c$ are defined in a similar way as in Equation 6. By incorporating $\varepsilon_c$ into the original loss $\varepsilon$, we gain additional information from m points, which help to reduce the overfitting risk and improve the overall performance. The typical value for $\gamma$ is between 0.5 and 2, while $\rho$ and $\sigma$ are between 0.1 and 1. Since the landmark loss and control point loss share the same form, the update of the network also shares the same form as in Equation 7 and Equation 8.

The system is composed by three steps: the convolutional layers for extracting features x, the SBN for computing the intermediate landmarks $y_s$, and the PDN for generating the final position $y_p$. Our network can be trained from scratch in an end-to-end manner. However, recent work has shown that a proper initialization is vital in training a deep learning model. The Curriculum Learning is accomplished by decomposing the joint task into two simpler ones and pre-training the SBN and the PDN separately. To pre-train the SBN, we directly minimize Equation 3 without the PDN part. For convolutional layers, we initialized their weights as in the original VGG16 model because the knowledge learned from the ImageNet datasets can benefit our task. During the pre-training process, we first fix the convolutional weights and update the fully connected layers of the SBN only. When the error is not decreasing after 10 epochs, the network is relaxed to update both the convolutional layers and the fully connected layers. To pre-train the PDN, we drop the SBN component from the network and replace the input $y_s$ with the mean shape $\overline{y}$. Similarly, we fixed the convolutional weights like the SBN pre-training process and train the fully connected layers in the PDN only. After 10 epochs, we then train both the convolutional layers and the fully connected layers together.

After pre-training the SBN and the PDN separately, we then combine them in a joint network, where the SBN provides shape input $y_s$ to the PDN. The loss error is generated at the end of the PDN and is back-propagated to update the fully connected and the convolutional layers. With both pre-trained networks, we firstly update the weights of the PDN and fix the weights of the SBN. Then the weights from the SBN is relaxed and the entire network is updated jointly. As we have discussed in the previous section, to prevent overfitting, a 2-loss objective function is introduced in Equation 9. From the training data, mapping from initialized landmarks to the ground truth annotation, we calculate the TPS transform of each set of initialized landmarks to their ground truth landmarks offline. Then we apply the same TPS transform on the control points, which are uniformly sampled across the images, to obtain the transformed control points. In this way, we generate another set of training data. All the training procedures introduced above are applied on the newly generated training data. Once the control point based network is trained, we directly apply the landmark based training data on the network and penalize both the loss from control points and the loss from landmarks. The reason why the landmark based training data is not directly applied is that, once the network is trained based on the sparse landmark annotation, the overfitting is hard to be regularized. In contrast, initially applying the dense control point training data prevents the network from being overfitting. Then adding on the landmark constraint refines the network to be more specific to the localization task.

The training for each specific task, i.e., face localization, human body pose estimation, should be independent. The annotations for different tasks may be largely different. The image appearance also varies a lot from one task to another.

For instance, the human face images share a face-centric layout, while the human body layout is more variant. The bodies may appear with all types of gestures, i.e. lay down, upside down, folding, which is much more than the facial gestures. Thus, the filters inside the convolutional layers may have much different responses. Though different tasks need independent training, we propose a general uniform CNN structure to explore the commonality across the pose estimation or landmark localization problems.

The Deep Deformable Network (DDN) can be used on many different pose estimations, including: facial landmark localization, human body pose estimation, and bird keypoint prediction. Localizing facial landmarks is a fundamental step in facial image analysis. However, the problem is still challenging due to the large variability in pose and appearance, and the existence of occlusions in real-world face images. Compared to faces, the human body has a much larger degree of freedom to deform in space. Because of the high non-rigidity, human body pose estimation is much more challenging. The method uses a neural network structure. The difference is, we incorporate the body structure inference into the network. For instance, the Shape Basis Network constructs a flexible body structure estimation. Moreover, the Point Deformation Network firstly refines the body landmark positions. All the modules are integrated into an end-to-end network both for training and testing. The bird key-point prediction is even different from the human body pose estimation. Some spatial shift of the landmarks does not violate the landmark definition. In this sense, the bird landmark localization task is more challenging due to the uncertainty.

The end-to-end Deep Deformation Network generally deals with several independent pose estimation tasks, i.e. human pose estimation, face landmark localization, and bird pose estimation. Benefited from the CNN feature representation, we build up the Shape Basis Network for directly mapping from the features to the landmark transformation without bothering the feature maps. The SBN provides a fast and good initialization for the Point Deformation Network. Then the PDN applies the similar mapping from the CNN features to another point transformation to further refine the initialization from the SBN. In contrast to the DPM, the overall DDN structure incorporates neither handcrafted feature nor part-based connections, which saves on complex configurations for training and testing. The end-to-end Deep Deformation Network can facilitate different pose estimation tasks and achieve advantageous performance compared to other state-of-the-arts for all pose estimation tasks.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a convolutional neural network system 100 is illustratively shown. The convolutional neural network system 100 includes a four stage convolutional structure 110. In one embodiment, the four stage convolutional structure 110 is comprised of hardware. The four stage convolutional structure 110 generates a response map from an image that is used by a shape basis neural network 120. In one embodiment, the shape basis neural network 120 is comprised of hardware. The shape basis neural network 120 uses the response map to generate a set of landmark points used by a point deformation neural network 140. In one embodiment, the point deformation neural network 140 is comprised of hardware. The point deformation neural network 140 uses the response map and the set of landmark points to generate an optimal shape of the image.

Figure 2:
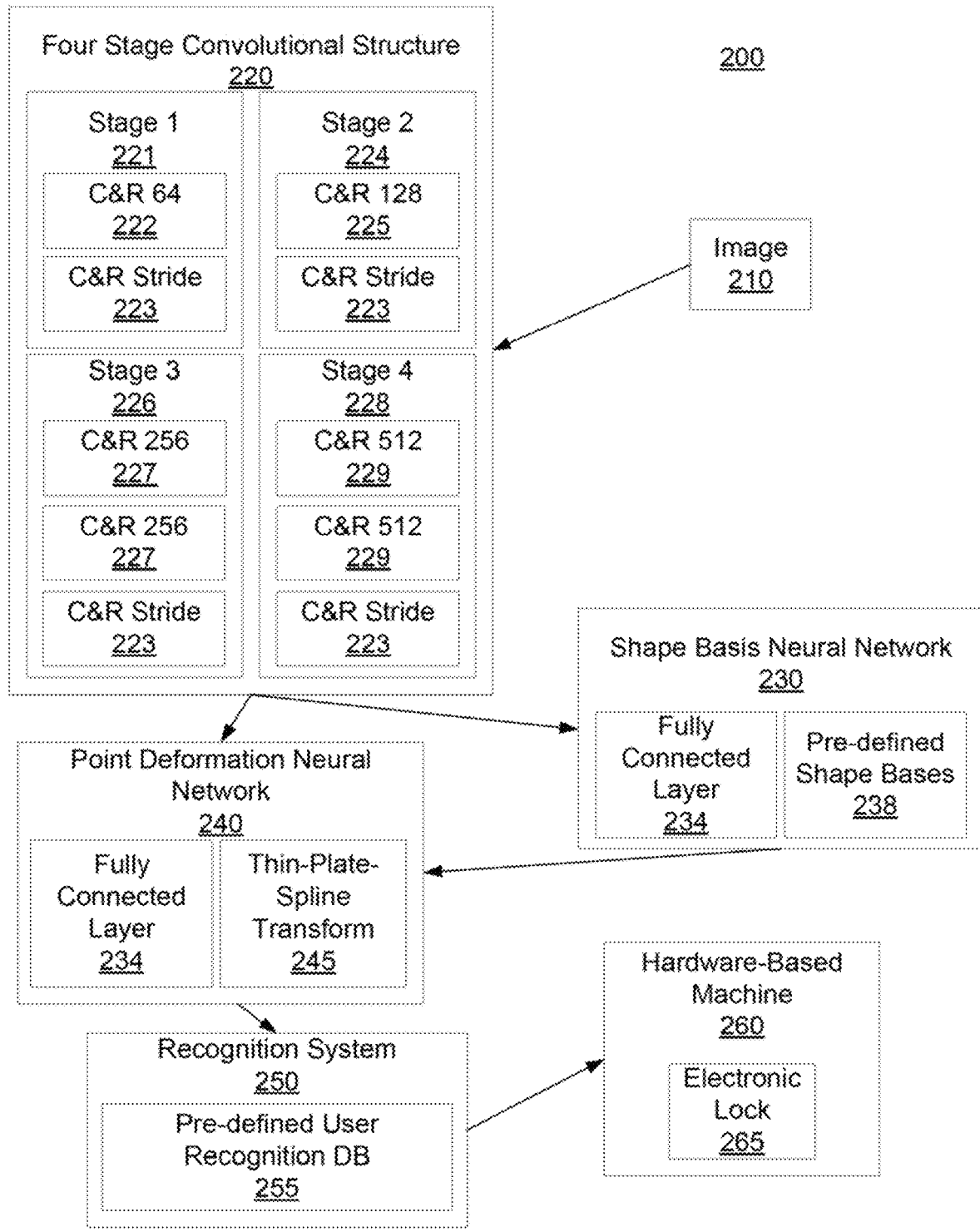
FIG. 2 is a block diagram illustrating a system, in accordance with an embodiment of the present invention.

Referring now to FIG. 2, a system 200 is illustratively shown. The system 200 has an image 210. The image 210 enters the four stage convolutional structure 220. The four stage convolutional structure 220 has four stages. In one embodiment, Stage 1 221 of the four stages may have a plurality of C&R 64's (hereafter "C&R 64") 222 and a plurality of C&R Stride's (hereafter "C&R Stride") 223. The C&R 64 222 may have a plurality of convolution layers and a plurality of rectified linear unit layers. The image 210 may be processed in the C&R 64 222 of stage 1 221 before the results are passed into the C&R Stride 223. The C&R Stride 223 may shift the pixels in the results. The pixel shift may be a stride by 2.

In another embodiment, Stage 2 224 of the four stages may have a plurality of C&R 128's (hereafter "C&R 128") 225 and a plurality of C&R Stride's (hereafter "C&R Stride") 223. The C&R 128 225 may have a plurality of convolution layers and a plurality of rectified linear unit layers. The results from stage 1 221 may be processed in the C&R 128 225 of stage 2 224 before the results are passed into the C&R Stride 223. The C&R Stride 223 may shift the pixels in the results. The pixel shift may be a stride by 2.

In yet another embodiment, Stage 3 226 of the four stages may have a plurality of C&R 256's (hereafter "C&R 256") 227 and a plurality of C&R Stride's (hereafter "C&R Stride") 223. The C&R 256 227 may have a plurality of convolution layers and a plurality of rectified linear unit layers. The results from stage 2 224 may be processed multiple times in the plurality of C&R 256's 227 of stage 3 226 before the results are passed into the C&R Stride 223. The C&R Stride 223 may shift the pixels in the results. The pixel shift may be a stride by 2.

In one more embodiment, Stage 4 228 of the four stages may have a plurality of C&R 512's (hereafter "C&R 512") 229 and a plurality of C&R Stride's (hereafter "C&R Stride") 223. The C&R 512 229 may have a plurality of convolution layers and a plurality of rectified linear unit layers. The results from stage 3 226 may be processed multiple times in the plurality of C&R 512's 229 of stage 4 228 before the results are passed into the C&R Stride 223. The C&R Stride 223 may shift the pixels in the results. The pixel shift may be a stride by 2.

The four stage convolutional structure 220 generates a response map. In one embodiment, the response map may be a 7-by-7 response map of 512 channels. The response map is processed by the shape basis neural network 230. In one embodiment, the shape basis neural network may have a pre-defined shape bases 238. In another embodiment, the shape basis neural network 230 may have one or more fully connected layers (hereafter "fully connected layer") 234. A fully connected layer 234 may generate a first vector from the response map. Another fully connected layer 234 may generate a second vector from the first vector. In yet another embodiment, the shape basis neural network 230 may take the inner product of the second vector and the pre-defined shape bases 238 to generate a plurality of landmark points.

The plurality of landmark points are processed by the point deformation neural network 240. In one embodiment, the point deformation neural network 240 may have a one or more fully connected layers (hereafter "fully connected layer") 234. A fully connected layer 234 may generate a third vector from the response map. Another fully connected layer 234 may generate a fourth vector from the third vector. In another embodiment, the point deformation neural network 240 may have a thin-plate-spline transform 245. The point deformation neural network 240 may generate an optimal shape from the fourth vector and the plurality of landmark points with the thin-plate-spline transform 245.

The optimal shape from the image is processed by a recognition system 250. In one embodiment, the recognition system 250 may have a pre-defined user recognition database 255. The recognition system 250 may use the optimal shape and the pre-defined user recognition database 255 to generate a recognition result for the image. The recognition system may send a signal to a hardware-based machine 360 based on the recognition results. In one embodiment, the hardware-based machine may comprise an electronic lock 365. The signal sent to the hardware-based machine 360 based on the recognition results may unlock the electronic lock 365.

Figure 3:
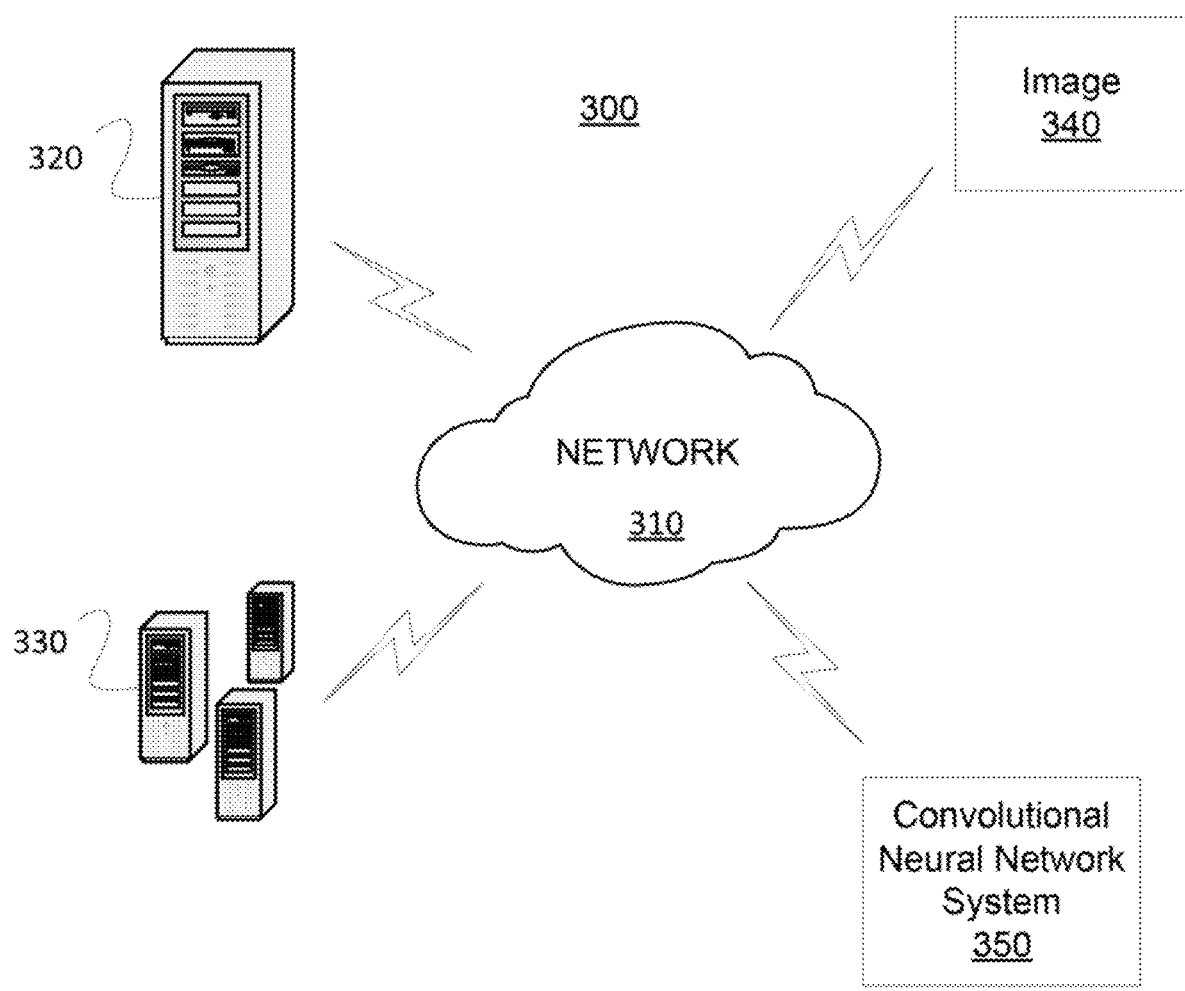
FIG. 3 is schematic illustrating convolutional neural network system communications, in accordance with an embodiment of the present invention.

Referring now to FIG. 3, a network interface 300 provides for the convolutional neural network system 350 to interact with other hardware remotely. The convolutional neural network system 350 can communicate with a server 320 or a plurality of servers 330 through a network 310. The convolutional neural network system 350 can get an image 340 to process through the network 310.

Figure 4:
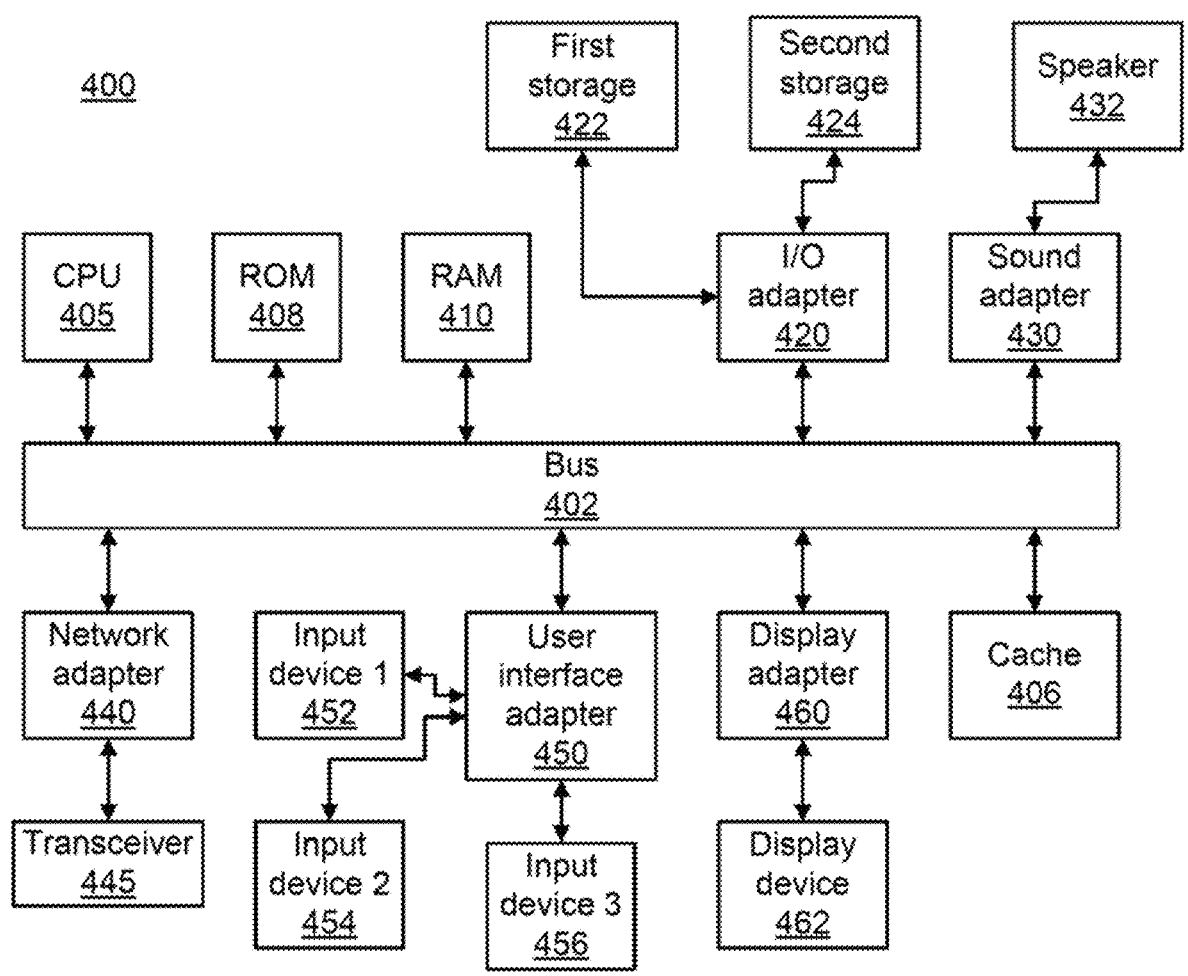
FIG. 4 is a block diagram illustrating a computer system, in accordance with an embodiment of the present invention.

Referring to FIG. 4, an exemplary computer system 400 is shown which may represent a node in a neural network, in accordance with an embodiment of the present invention. The computer system 400 includes at least one processor (CPU) 405 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 may be operatively coupled to system bus 402 by the sound adapter 430. A transceiver 445 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 452, 454, and 456 can be the same type of user input device or different types of user input devices. The user input devices 452, 454, and 456 are used to input and output information to and from system 400.

Of course, the computer system 400 may also include other elements (not shown), as readily contemplated by one of skill in the art, as well as omit certain elements. For example, various other input devices and/or output devices can be included in computer system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 400 are readily contemplated by one of ordinary skill in the art given the teachings of the present invention provided herein.

Referring to FIG. 5, a flow chart for a method 500 of estimating object poses is illustratively shown, in accordance with an embodiment of the present invention. In block 510, generate, by a processor with a four stage convolutional structure, a response map for an image. In block 520, generate, by the processor using a shape basis neural network, a plurality of landmark points for the image based on the response map. In block 530, generate, by the processor using a point deformation neural network, an optimal shape for the image based on the plurality of landmarks for the image and the response map. In block 540, identify, by a recognition system, the image based on the generated optimal shape to generate a recognition result of the image. In block 550, operate a hardware-based machine based on the recognition result.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for using a convolutional neural network comprising:
    generating, by a processor using a four stage convolutional structure, a response map for an image;
    generating, by the processor using a shape basis neural network (SBN), a plurality of landmark points for the image based on the response map;
    generating, by the processor using a point deformation neural network (PDN), an optimal shape for the image based on the plurality of landmark points for the image, synthesized landmarks generated from a plurality of landmarks, and the response map;
    identifying, by a recognition system, the image based on the generated optimal shape to generate a recognition result of the image; and
    operating a hardware-based machine based on the recognition result,
    wherein performance of the convolutional neural network is improved by decomposing joint tasks into two less complex tasks and pre-training an SBN and PDN separately, and
    wherein the pre-training includes, given a PCA shape model ($\bar{y}$ and Q) and a set of training images (x), pre-training the SBN for an optimal embedding of $x_s=f(w_s, x)$, minimizing a Euclidian distance between an SBN prediction and a ground-truth (y) by $$\min_{w_s} F = \|y - (\bar{y} + Qx_s)\|_2^2 + \lambda\|x_s\|_2^2,$$

and wherein a gradient of a loss F over $x_s$ is determined by $$\frac{\partial F}{\partial x_s} = 2\lambda x_s - 2Q^T(y - (\bar{y} + Qx_s))$$

and back-propagated to update parameters of fully connected layers and lower convolutional layers, where $w_s$ represents the fully connector layers in the SBN, and $\lambda$ is a regularization factor penalizing coefficients with a large $l_2$ norm.

2. The method as recited in claim 1, wherein the point deformation neural network applies a non-linear transformation to the plurality of landmark points for the image.

3. The method as recited in claim 1, wherein the four stage convolutional structure comprises a plurality of convolutional layers and a plurality of rectified linear unit layers.

4. The method as recited in claim 1, wherein the response map includes a 7-by-7 response map for each of 512 channels.

5. The method as recited in claim 1, wherein the point deformation neural network deforms the plurality of landmarks for the image using a Thin-Plate-Spline (TPS) transformation.

6. The method as recited in claim 5, wherein the deformation of the plurality of landmark points for the image is constrained by controlling a point grid regularization method.

7. The method as recited in claim 1, wherein the shape basis neural network applies a constraint on a global geometry of the plurality of landmarks for the image.

8. The method as recited in claim 1, wherein the shape basis neural network and the point deformation neural network are trained jointly with the same plurality of images.

9. The method as recited in claim 1, wherein the plurality of landmark points for the image comprises a linear combination of pre-defined shape bases.

10. The method as recited in claim 1, wherein the shape basis neural network applies a non-linear transformation to the response map.

11. The method as recited in claim 1, wherein the recognition system is included in a security system that captured the image.

12. The method as recited in claim 1, wherein operating the hardware-based machine based on the recognition result comprises actuating an unlock mechanism of a lock to grant, to a user depicted and recognized in the image, access to an item selected from the group consisting of a device and a facility.

13. The method as recited in claim 1, wherein operating the hardware-based machine based on the recognition result comprises stopping the hardware-based machine to mitigate a risk posed to a user by the hardware-based machine.

14. A non-transitory article of manufacture tangibly embodying a computer readable program which when executed causes a computer to perform the steps of claim 1.

15. A system comprising:
    a processor, configured to:
        generate a response map for an image, using a four stage convolutional structure;
        generate a plurality of landmark points for the image based on the response map, using a shape basis neural network (SBN); and
        generate an optimal shape for the image based on the plurality of landmark points for the image, synthesized landmarks generated from a plurality of landmarks, and the response map, using a point deformation neural network (PDN); and
    a recognition system configured to identify the image based on the generated optimal shape to generate a recognition result of the image,
    wherein the processor is further configured to operate a hardware-based machine based on the recognition result,
    wherein performance of the convolutional neural network is improved by decomposing joint tasks into two less complex tasks and pre-training an SBN and PDN separately, and
    wherein the pre-training includes, given a PCA shape model ($\bar{y}$ and Q) and a set of training images (x), pre-training the SBN for an optimal embedding of $x_s=f(w_s, x)$, minimizing a Euclidian distance between an SBN prediction and a ground-truth (y) by $$\min_{w_s} F = \|y - (\bar{y} + Qx_s)\|_2^2 + \lambda\|x_s\|_2^2,$$

and wherein a gradient of a loss F over $x_s$ is determined by $$\frac{\partial F}{\partial x_s} = 2\lambda x_s - 2Q^T(y - (\bar{y} + Qx_s))$$

and back-propagated to update parameters of fully connected layers and lower convolutional layers, where $w_s$ represents the fully connector layers in the SBN, and $\lambda$ is a regularization factor penalizing coefficients with a large $l_2$ norm.

16. The system as recited in claim 15, wherein the point deformation neural network applies a non-linear transformation to the plurality of landmark points for the image.

17. The system as recited in claim 15, wherein the four stage convolutional structure comprises a plurality of convolutional layers and a plurality of rectified linear unit layers.

18. The system as recited in claim 15, wherein the point deformation neural network deforms the plurality of landmarks for the image using a Thin-Plate-Spline (TPS) transformation.

19. The system as recited in claim 15, wherein the shape basis neural network applies a constraint on a global geometry of the plurality of landmarks for the image.

20. The system as recited in claim 15, wherein the plurality of landmark points for the image comprises a linear combination of pre-defined shape bases.

21. A processor configuration comprising:
a processor, configured to:
generate a response map for an image, using a four stage convolutional structure;
generate a plurality of landmark points for the image based on the response map, using a shape basis neural network (SBN); and
generate an optimal shape for the image based on the plurality of landmark points for the image, synthesized landmarks generated from a plurality of landmarks, and the response map, using a point deformation neural network (PDN); and
operate a hardware-based machine based on a recognition result obtained from a recognition system configured to identify the image based on the generated optimal shape to generate the recognition result of the image,
wherein performance of the convolutional neural network is improved by decomposing joint tasks into two less complex tasks and pre-training an SBN and PDN separately, and
wherein the pre-training includes, given a PCA shape model ($\bar{y}$ and Q) and a set of training images (x), pre-training the SBN for an optimal embedding of $x_s=f(w_s, x)$, minimizing a Euclidian distance between an SBN prediction and a ground-truth (y) by $$\min_{w_s} F = \|y - (\bar{y} + Qx_s)\|_2^2 + \lambda\|x_s\|_2^2,$$

and wherein a gradient of a loss F over $x_s$ is determined by $$\frac{\partial F}{\partial x_s} = 2\lambda x_s - 2Q^T(y - (\bar{y} + Qx_s))$$

and back-propagated to update parameters of fully connected layers and lower convolutional layers, where $w_s$ represents the fully connector layers in the SBN, and $\lambda$ is a regularization factor penalizing coefficients with a large $l_2$ norm.

* * * * *